United States Patent

[11] 3,586,076

| [72] | Inventors | Francis J. Rosenthal, Jr.<br>Fork;<br>Leonard U. Alsruhe, Towson, both of, Md. |
|---|---|---|
| [21] | Appl. No. | 839,446 |
| [22] | Filed | July 7, 1969 |
| [45] | Patented | June 22, 1971 |
| [73] | Assignee | The Black and Decker Manufacturing Company<br>Towson, Md. |

[54] RIP LOCK FOR RADIAL ARM SAW
2 Claims, 7 Drawing Figs.

| [52] | U.S. Cl. | 146/6 A |
|---|---|---|
| [51] | Int. Cl. | B27b 5/20 |
| [50] | Field of Search | 143/6-1, 6-47, 6, 47-6 |

[56] References Cited
UNITED STATES PATENTS

| 1,813,568 | 7/1931 | De Walt | 143/6 A X |
|---|---|---|---|
| 2,564,350 | 8/1951 | Wilson | 143/6 A UX |
| 2,584,863 | 2/1952 | Gesner | 143/6 (-1.2) |
| 2,602,710 | 7/1952 | Gesner | 143/43-6 UX |
| 2,773,524 | 12/1956 | Schultz et al. | 143/6 A X |
| 3,092,154 | 6/1963 | Dobslaw | 143/6 A |

*Primary Examiner*—Donald R. Schran
*Attorneys*—Leonard Bloom and Joseph R. Slotnik ABSTRACT: The device disclosed herein is a radial arm saw which includes a base frame having an upstanding column pivoted thereon about a generally vertical axis. A radial arm is rigid with the column and has a saw carriage supported thereon for movement therealong. TA motor driven saw is suspended from the carriage and is adapted to cut workpieces situated on a table supported upon the base frame.

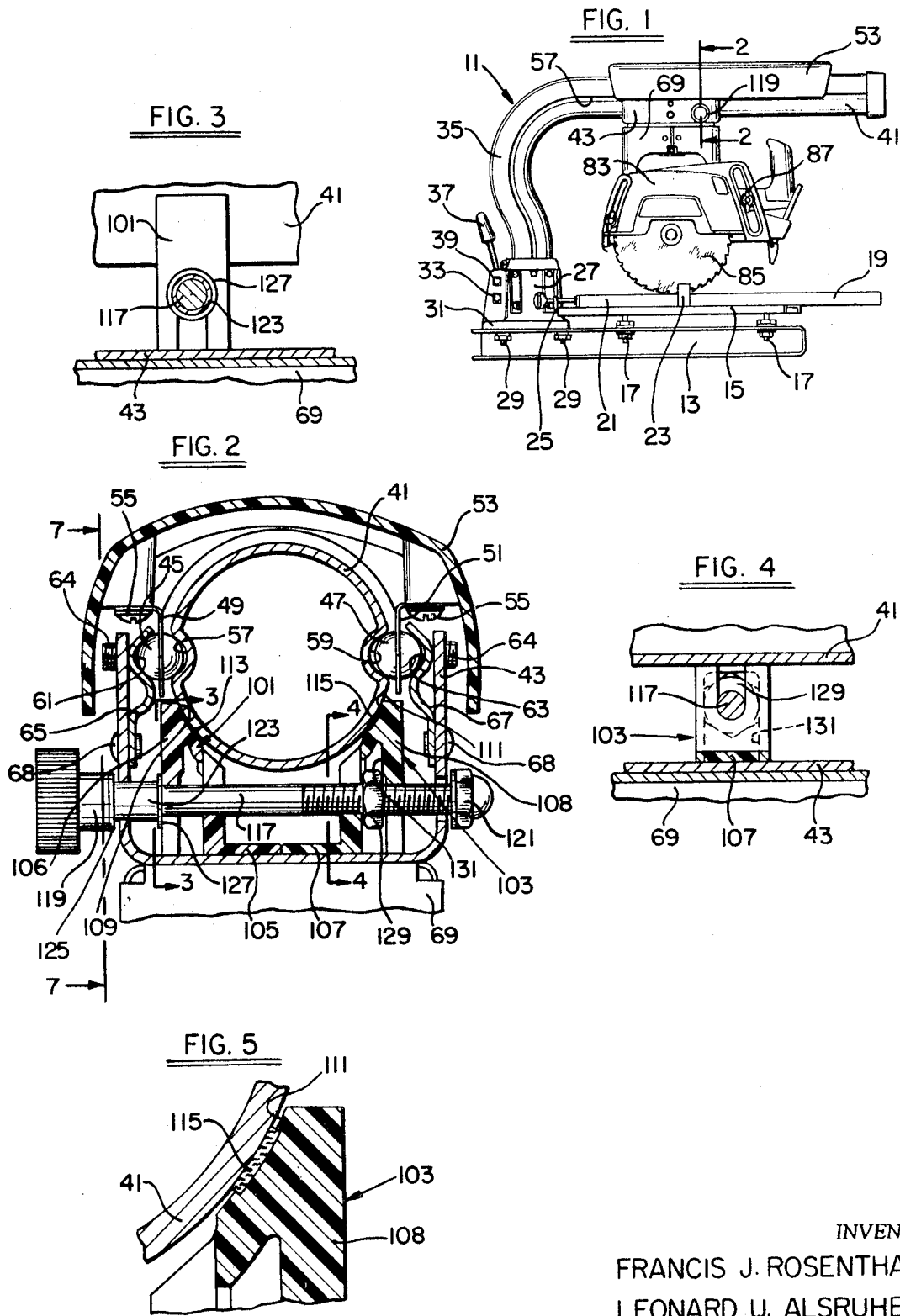

PATENTED JUN22 1971

INVENTORS
FRANCIS J. ROSENTHAL, JR.
LEONARD U. ALSRUHE

BY *Joseph R. Slotnick*

ATTORNEY 3,586,076

1

RIP LOCK FOR RADIAL ARM SAW

SUMMARY OF THE INVENTION

The present invention is directed to a novel device for locking the carriage to the arm in a radial arm saw. The device is intended to selectively lock the carriage to the radial arm for "ripping" and release the carriage for free travel along the radial arm for "crosscutting." The locking device advantageously minimizes part distortion or deflection which could result in inaccurate tool performance. In addition, the inventive device is simple and inexpensive, and is inherently versatile in that it readily could adapt to use in a variety of carriage-type tools.

Main objects of the present invention are to provide a novel locking device for a traveling tool carriage which is simple in construction and effective in operation, and which does not detract from tool accuracy.

Further important objects of the invention are to provide a novel carriage locking device of the above character which is highly versatile, which is relatively easy to operate, and which is reliable and consistent in performance.

Additional important objects are to provide a novel carriage locking device of the above character which is relatively inexpensive to manufacture and rugged in construction.

Other objects and advantages of the invention will become more apparent from a consideration of the detailed description to follow taken in conjunction with the drawings annexed hereto.

BRIEF DESCRIPTION OF THE DRAWINGS

FIG. 1 is a side elevational view illustrating a radial arm saw embodying the present invention;

FIG. 2 is an enlarged sectional view of FIG. 1 taken along the line 2—2 thereof;

FIG. 3 is a sectional view of FIG. 2 taken along the line 3—3 thereof;

FIG. 4 is a sectional view of FIG. 2 taken along the line 4—4 thereof;

FIG. 5 is an enlarged view of a portion of FIG. 2;

BROAD STATEMENT OF THE INVENTION

Figure 6:
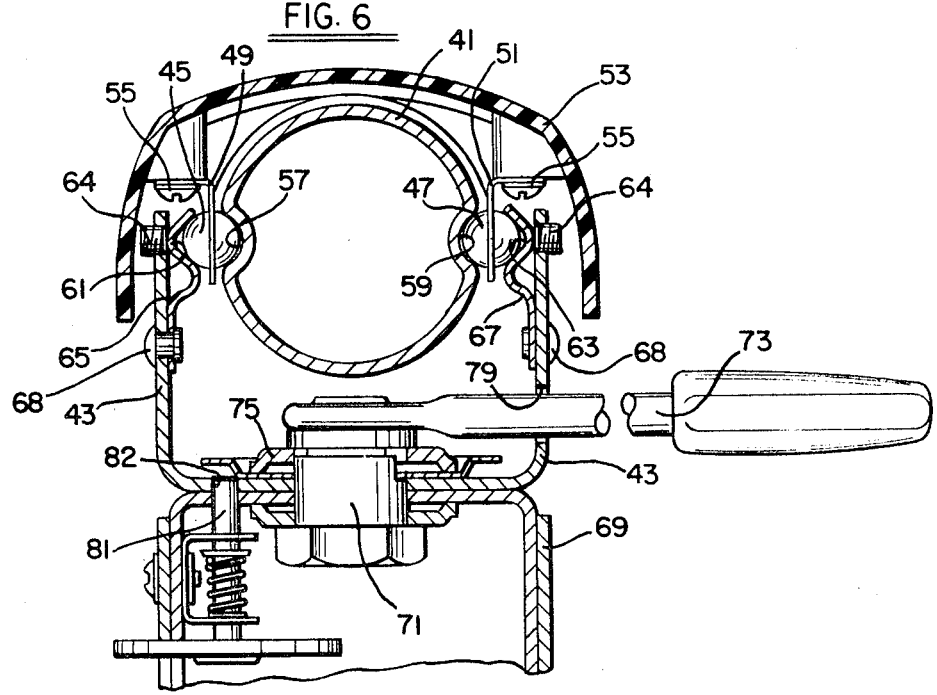
FIG. 6 is a sectional view of FIG. 7 taken along the line 6—6 thereof.

Broadly described, the present invention relates to a radial arm saw construction which includes a base having a worktable supported thereon, upstanding column means supported upon said base, a one-piece tubular arm rigid with said column means and extending over said worktable, elongated track means formed directly on the outer periphery of said arm carriage means engaging said track means and movable along said arm, saw means including a circular saw blade suspended from said carriage mans and movable therewith, manually operable mans carried by said carriage means and clampingly engageable with said arm to lock said carriage means to said arm means, said manually operable means being constructed and arranged such that the reaction forces on said carriage means to the clamping forces on said arm means are equalized in a direction laterally of said arm, whereby said clamping forces are ineffective to deflect said arm means transversely of said arm.

DETAILED DESCRIPTION

Referring now more specifically to the drawings, a radial arm saw embodying the present invention is illustrated generally at 11 in FIG. 1 and is seen to include a pair of base frames 13 (only one of which is shown) each having a cleat 15 secured thereto by fasteners 17. A worktable includes a stationary portion 19 secured to the cleats 15 and a removable portion 21 held against a work fence 23 by a plurality of clamps 25 (only one of which is shown).

The base frames 13 have an upstanding hollow hub 27 secured thereto by fasteners 29 which extend through the frames 13 and a base plate 31 formed integrally with the hub 27. The hub 27 is generally cylindrical in configuration and is split along a major portion of its length with a pair of opposed flanges 33 (only one of which is shown) formed adjacent the split ends. An upstanding column 35 has its lower end received in and supported by the hub 27 and is adapted to be secured in place therein by drawing up on the flanges 33 which reduces the internal dimension of the hub 27. To this end, a clamp lever 37 extends through the flanges 33 and has one end threaded into a trapped nut 39. Thus, by turning the lever 37 in one direction, the flanges 33 are drawn together and the hub 27 tightly grips the column 35 and locks it in place. When the lever 37 is turned in the opposite direction, the hub 27 is loosened on the column 35 and allows it to be turned about a generally vertical axis.

Figure 7:
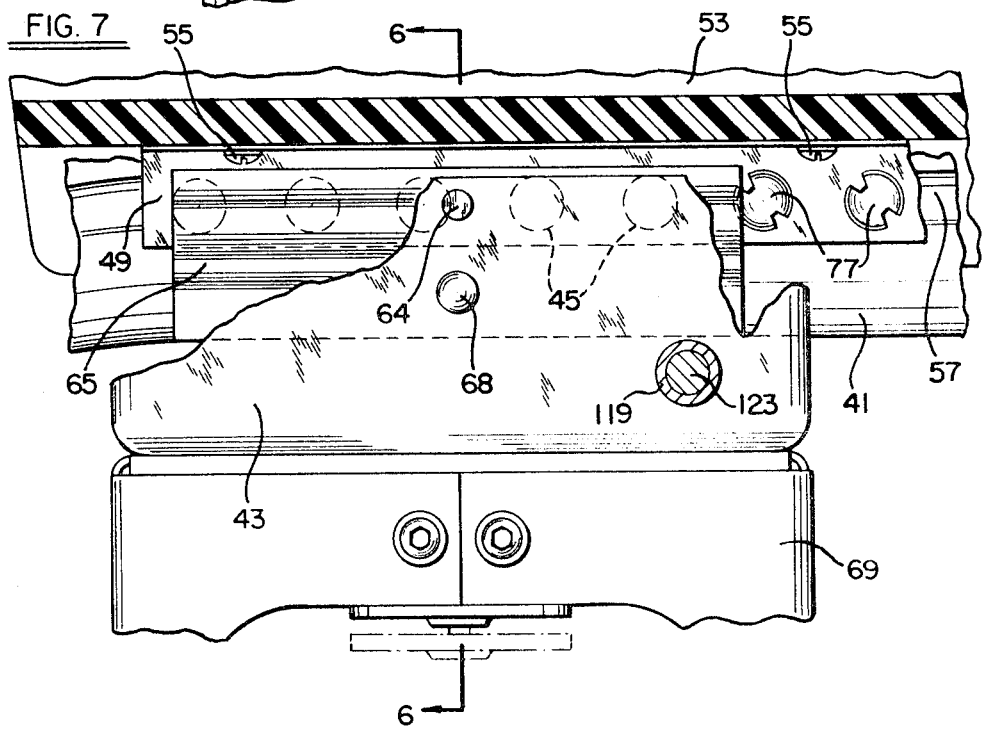
FIG. 7 is a sectional view of FIG. 2 taken along the line 7—7 thereof.

The column 35 has a radial arm 41 rigid (here integral) therewith and extending over the worktable. A generally U-shaped tool carriage 43 is supported for movement longitudinally of the arm 41 by two sets of balls 45, 47. As shown in FIGS. 2, 6 and 7, each set of balls 45, 47 is disposed in a carrier 49, 51 secured to a top shroud 53 by screws 55. The balls 45, 47 ride in groovelike tracks 57, 59 formed in opposite sides of the arm 41, and in tracks 61, 63 formed in serpentine cross-sectional retainers 65, 67, respectively. The retainers 65, 67 are secured along their lower portions to the interior of the carriage 43 by rivets. Thus, as the carriage 43 is moved longitudinally of the arm 41, the retainers 65, 67 cause the balls 45, 47 to roll between the tracks 57, 61 and 59, 63, respectively, so that the carriage 43 moves along the arm 41 with a minimum or friction. The carriage 43 is provided with set screws 64 to adjust the position of the retainers 65, 67 relative to the tracks 57, 59 for most efficient carriage travel.

A powered circular saw is suspended from the carriage 43 and includes a frame or yoke 69 disposed immediately beneath the carriage 43. The yoke 69 is secured to the carriage 43 for movement therewith longitudinally of the arm 41 but is adapted to be swiveled or pivoted about a generally vertical axis to accommodate both "crosscutting" and "ripping." To this end, a threaded fastener 71 extends upwardly through adjacent faces of the yoke 69 and carriage 43 and has a locking lever 73 threaded thereon. The fastener 71 is prevented from turning by a locking washer 75 keyed thereto and suitably fixed to the carriage 43. The locking lever 73 extends through an elongated slot 79 in the carriage 43. Thus, when the lever 73 is turned in one direction, the yoke 69 is locked to the carriage 43 while turning the lever 73 in the other direction allows the yoke 69 to be pivoted or swiveled. A manually releasable, spring biased detent pin 81 carried by the yoke 67 is adapted to fit selectively into openings 82 (only one of which is shown) in the carriage 43 to help position and releasably hold the yoke 69 in the "crosscutting" and "ripping" positions relative to the carriage 43.

The yoke 69 supports a saw motor (not shown) which is positioned with a rigid motor housing a guard frame 83. A saw blade 85 driven by the motor is partially encased by the guard frame 83 and is positioned to cut a workpiece positioned on the worktable. The motor housing and guard frame 83 are pivotally secured to the yoke 69 and is adjustable vertically relative thereto by means of a rack and pinion (not shown). A wing nut 87, on the end of a pinion shaft, is provided to releasably lock the guard frame 83 and blade 85 in selected vertical positions. However, since this construction forms no part of the present invention, it is not illustrated or described any further here. For a detailed illustration and description thereof, reference may be made to the copending application of Francis J. Rosenthal, Jr., Ser. No. 817,846, filed Apr. 21, 1969, now U.S. Pat. No. 3,565,136 and owned by the assignee of the present application.

As described briefly above, the yoke 69 is swiveled or pivoted relative to the carriage 43 to accommodate both "crosscutting" and "ripping." During "crosscutting," the yoke 69 and saw blade 85 are positioned as shown in FIG. 1 and the carriage 43 is movable freely along the arm 41 to cut a workpiece stationarily positioned on the worktable. During ripping, the yoke 69 is swiveled 90° from this position. The carriage 43 is then locked to the arm 41 and a workpiece is moved along the fence 23 past the saw blade 85.

According to the present invention, novel means is provided to releasably lock the carriage 43 to the arm 41. As shown in FIG. 2, a pair of opposed gibs 101, 103 are disposed within the carriage 43 on opposite sides of the arm 41. The gibs 101, 103 preferably but not necessarily are formed of a plastic material and each includes a base portion 105, 107 seated against the base of the carriage 43 and an upstanding portion 106, 108 provided with a concave surface 109, 111, respectively, confronting the arm 41. A high friction, brake lining material 113, 115 is set in the concave surfaces 109, 111 and is engageable with the arm 41 when the gibs 101, 103 are drawn together. A carriage bolt 117 extends through the carriage 43 and through the gibs 101, 103 and has a knob 119 fixed at one end and a nut 121 threaded on the other end thereof. The bolt 117 carries a spacer sleeve 123 between the knob 119 and the gib 101. A pair of washers 125, 127 disposed on opposite sides of the spacer 123 bear against the outer side of the carriage 43 and the gib 101, respectively. A nut 129 threaded on the carriage bolt 117 is trapped in a recess 131 in the gib 103.

When the knob 117 is turned in one direction, the trapped nut 129 is pulled up on the carriage bolt 117. This, together with the washer 127 which bears against the gib 101, pulls the gibs 101, 103 together causing the friction material 113, 115 to tightly grip the arm 41 thereby locking the carriage 43 to the arm 41. When the knob 119 is turned in the opposite direction, the action of the nut 129 pushes the gibs 101, 103 apart thereby releasing the friction material 113, 115 from the arm 41. In this relation of the parts, the carriage 43 is free to travel along the arm.

It will be appreciated that the construction, arrangement and interrelationship of the gibs 101, 103, the carriage bolt 117, and the carriage 43 is such that when the gibs 101, 103 are drawn against the arm 41, the reaction forces on the carriage 43 to the clamping forces on the arm 41 are neutralized in a direction laterally of carriage travel so that substantially no distortion or part deflection occurs in this direction. This, in turn, provides for maximum accuracy in use of the device.

In use then, the yoke 69 is positioned as shown in FIG. 1 for "crosscutting." In this position, the gibs 101, 103 are released from the arm 41 so that the carriage 43 and saw may be manually moved freely along the arm 41 to perform a crosscut on a workpiece situated on the worktable. When it is desired to perform a "ripping" operation, the yoke 69 is pivoted 90° from this position and is locked by the lever 73. The carriage 43 is then moved to the desired position along the arm 41 and locked by turning the knob 119 and drawing up on the gibs 101, 103 whereby the fraction material 113, 115 is pressed tightly against the arm 41.

By the foregoing, there has been disclosed a novel carriage lock for a carriage-type tool calculated to fulfill the inventive objects set forth hereinabove, and while a preferred embodiment has been set forth in detail, various additions, substitutions, modifications and omissions may be made thereto.

I claim:

1. A radial arm saw construction which includes a base having a worktable supported thereon, upstanding column means supported upon said base, a one-piece tubular arm rigid with said column means and extending over said worktable, elongated track means formed directly on the outer periphery of said arm, carriage means engaging said track means and movable along said arm, saw means including a circular saw blade suspended from said carriage means and movable therewith, manually operable means carried by said carriage means and clampingly engageable with said arm to lock said carriage mans to said arm, said manually operable means being constructed and arranged such that the reaction forces on said carriage means to the clamping forces on said arm are equalized in a direction laterally of said arm, whereby said clamping forces are ineffective to deflect said saw means transversely of said arm.

2. The construction as defined in claim 1 wherein said manually operable means includes an opposed pair of clamping members loosely supported upon said carriage means and having surface portions confronting and shaped generally complementary to said arm, bolt means extending through said clamping members and accessible externally of said carriage means, said boot means bearing axially against one of said clamping members and operatively threadedly engaged with the other of said clamping members.